A. H. SASSAMAN.
Car Brake.
No. 79,149. Patented June 23, 1868.
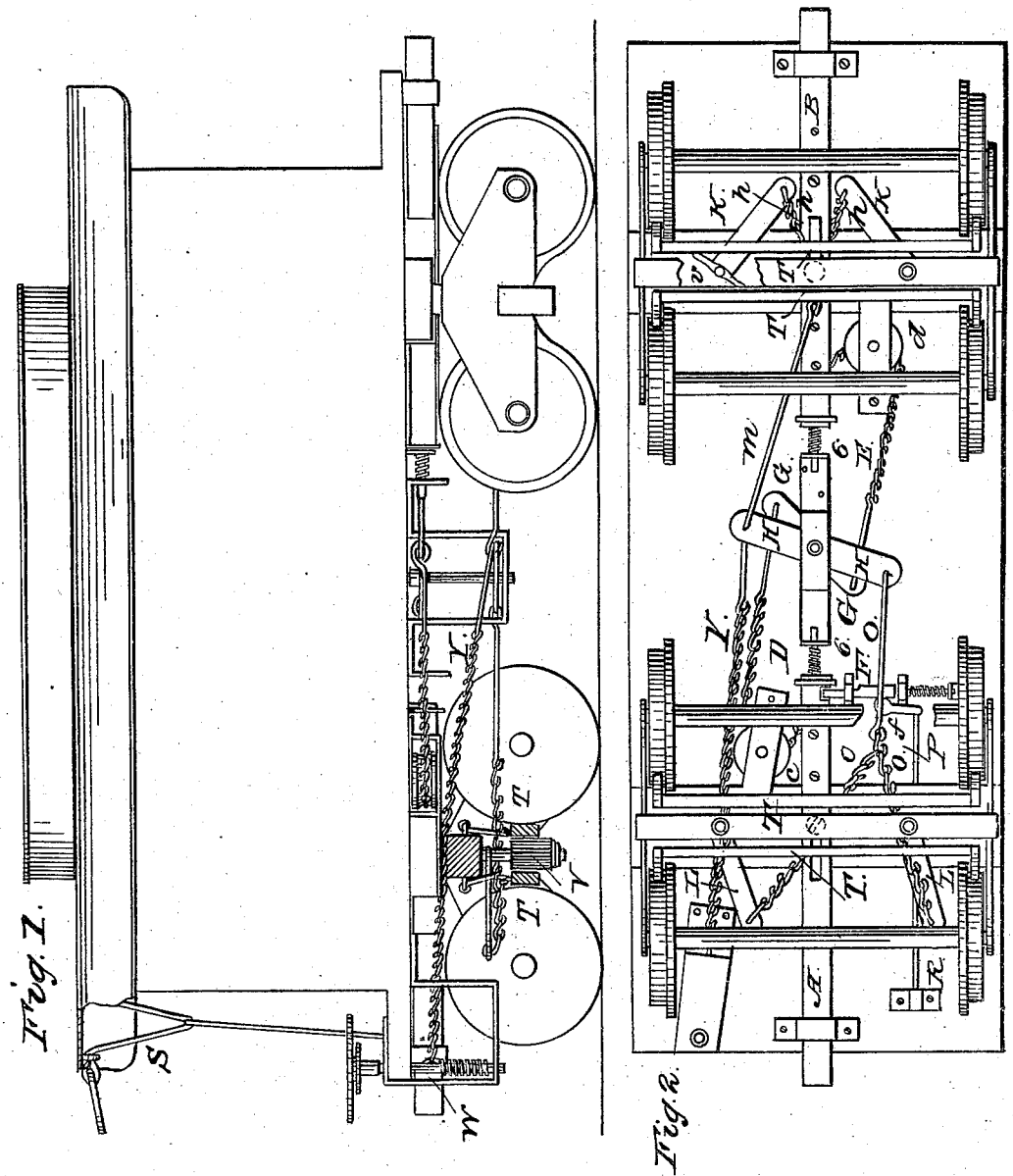

United States Patent Office.

AMBROSE H. SASSAMAN, OF LEBANON, PENNSYLVANIA.

Letters Patent No. 79,149, dated June 23, 1868.

IMPROVED CAR-BRAKE.

*The Schedule referred to in these Letters Patent and making part of the same.*

TO ALL WHOM IT MAY CONCERN:

Be it known that I, AMBROSE H. SASSAMAN, of Lebanon, in the county of Lebanon, and State of Pennsylvania, have invented a new and valuable Improvement in Railway-Car Brakes; and I do hereby declare that the following is a full, clear, and exact description of the construction and operation of the same, reference being had to the annexed drawings, making a part of this specification, and to the letters and figures of reference marked thereon.

Figure 1, of the drawings, represents a side view of a railway-car with one set of wheels removed to show the method of adjusting and operating my brake.

Figure 2 is an inverted plan view of my brake attached to a car.

The object of my invention is to provide better means than have heretofore been known for arresting the velocity of a car and bringing it to a halt, and more especially to arrest its speed in passing a down-grade, by providing that the pressure of the cars themselves may operate the brake at the will of the conductor.

The letters A and B represent two bumpers, adjusted to the car in the manner shown, each being hung in staples to the bottom of the car, and having sufficient play-room on beams attached to said car-bottom. These bumpers are also respectively connected with spiral springs at their inner ends, that operate between them and the shoulders C. They are also connected with the chains D and E respectively, and the bumper A is connected and operates in conjunction with the lock F, all of which are hereinafter described.

The shoulders C are iron projections, downward from the bottom of the car, between which and the inner ends of bumpers A and B respectively I adjust the spiral springs $a\ a$, in the manner shown.

The letters G and H are arms, adjusted on a pivoted bar, in the manner represented, between the bottom of the car and a stirrup attached thereto. Letter D is a chain, extending from bumper A around pulley $c$ to one end of arm G. Letter E is a chain, extending from bumper B around pulley $d$ to the opposite end of arm G.

Letters K K are levers, attached to the beam of the front truck of the car, and letters L L are similar levers, attached to the beam of the rear truck of the car. The mode of said attachment and the form of said levers respectively are shown in the drawings.

Letters M and O are rods, extending from each end of arm H to a point immediately in the rear of the beams of the two car-trucks, where they are connected respectively with the short chains $h\ h$ and $o\ o$, which said short chains are in turn connected, in the manner shown, with the levers K K and L L.

Letter F is a lock, adjusted in staples to the bottom of the car. It has a spiral spring at one end, marked $g$, that operates between the end of the bolt and a shoulder on the car-bottom. It has also a slot on its upper side, and next the car-bottom, in which the key is operated, as hereinafter mentioned. The upper end of this lock-bolt is adjusted to fit in a slot or shoulder, near the inner end of bumper A. Letter $f$ is a key, constructed in the form of a hook, pivoted to the car-bottom, in the manner shown, and operated with a wire or chain, P. This wire P extends from the end of the long arm of key $f$ to the pulley R, near the rear of the car, and passing around said pulley extends upward, and is connected with the bell-rope, near the car-top, as shown at letter S on fig. 1.

The letters T are the brakes, constructed in the usual form, and operated by the wedges V, as hereinafter mentioned.

The wedges V are four in number, each of which is attached respectively to standards that extend downward from the respective beams of the trucks, in the manner represented on the drawings. They operate respectively between the brakes of the cars, and are affixed to the same standards respectively as the levers K K and L L. They are shaped in the form somewhat of the letter S, and in operation force the brakes apart and against the car-wheels.

Letter Y is a chain, connected with the end of arm H, and extends rearward to and around the capstan W, by which the brakesman is enabled to move the braking-machinery when he desires so to do.

My device is operated as follows:

In passing a down grade the cars naturally crowd forward towards the locomotive, and it often is desirable to check their speed. In that case the conductor pulls the bell-rope, and thereby releases the lock F from its shoulder in bumper A. This movement releases said bumper, and allows it to crowd forward. At the same time the bumper B is crowded rearward, and the united action of the two, acting in conjunction with the levers, arms, chains, and pulleys, herein described, and with which they are connected, forces the wedges V against the brakes, and the brakes against the car-wheels.

To stop the cars, the brakesman turns the capstan in the usual manner.

What I claim as my invention, and desire to secure by Letters Patent, is—

A brake for railway-cars, having lock F, wedges V, arms G and H, levers K K and L L, chains D E, $h$ $h$, $o$ $o$, and Y, and rods P, M, and O, constructed, combined, and arranged substantially as specified.

AMBROSE H. SASSAMAN.

Witnesses:
 NELSON DELANY,
 MATTHEW MENGO.